United States Patent [19]

Harrison

[11] Patent Number: 4,633,587
[45] Date of Patent: Jan. 6, 1987

[54] SPRING-BIASED GARDEN PRUNERS

[75] Inventor: Christopher R. B. Harrison, Mid-Glamorgan, Wales

[73] Assignee: Wilkinson Sword Limited of Sword House, High Wycombe, England

[21] Appl. No.: 741,326

[22] Filed: Jun. 4, 1985

[30] Foreign Application Priority Data

Jun. 16, 1984 [GB] United Kingdom ............... 8415418

[51] Int. Cl.$^4$ ............................................. B26B 13/00
[52] U.S. Cl. ..................................... 30/261; 30/213; 81/321; 81/417
[58] Field of Search .................... 30/261, 213; 81/321, 81/427, 417

[56] References Cited

U.S. PATENT DOCUMENTS

| 516,109 | 3/1894 | Priest | 30/213 |
| 2,827,815 | 3/1958 | Smoyak | 81/417 |
| 4,073,059 | 2/1978 | Wallace et al. | 30/261 |

FOREIGN PATENT DOCUMENTS

| 216821 | 6/1924 | United Kingdom . |
| 291432 | 9/1928 | United Kingdom . |
| 1191341 | 5/1970 | United Kingdom . |
| 1155077 | 11/1979 | United Kingdom . |

Primary Examiner—E. R. Kazenske
Assistant Examiner—Willmon Fridie, Jr.
Attorney, Agent, or Firm—John K. Williamson

[57] ABSTRACT

A garden pruner has a leaf spring 14 secured at its outer end to one of the handles (12a) and engaging the other handle (11a) at its inner end. A slider (15) on the one handle (12a) slidably engages the leaf spring and is movable to vary the length of the spring between the slider and the inner end of the spring and thereby vary the spring force and spring rate.

5 Claims, 3 Drawing Figures

SPRING-BIASED GARDEN PRUNERS

BACKGROUND TO THE INVENTION

This invention relates to garden pruners of the type comprising a pair of members, each comprising a handle and a work-engaging portion or jaw, one jaw comprising a blade and the other jaw comprising an anvil or a second blade for cooperation with the first blade, pivot means pivotally interconnecting the members and a spring biassing the members apart to urge the work-engaging portions or jaws to an open position.

The force of the spring will usually be selected to suit as many as possible of the potential users of the tool. However, in some applications such, for example, as when cutting thick wood, it is desirable to have a relatively high spring force to ensure disengagement of the pruner from the work.

SUMMARY OF THE INVENTION

According to the present invention there is provided a garden pruner of the type comprising a pair of members, each comprising a handle and a work-engaging portion, pivot means pivotally interconnecting the members, a spring biassing the members apart, and means mounted on one of the handles and movable to vary the force applied by the spring.

In one particular form, the spring is a leaf spring secured to said one of the handles and the means for varying the force of the spring is movable to vary the effective length of the spring.

More particularly, the means for varying the effective length of the spring is a slider movable along the spring.

In a preferred embodiment, the spring extends along one of the handles and the slider is slidable along said one of the handles, the slider being a plastics member containing a groove within which the leaf spring engages, the handle containing a guide extending longitudinally of the handle within which the slider is received, and a button integral with the slider and projecting above the surrounding surface of the handle.

BRIEF DESCRIPTION OF THE DRAWINGS

The invention will now be particularly described, by way of example only, with reference to the accompanying drawings in which.

DETAILED DESCRIPTION

Figure 1:
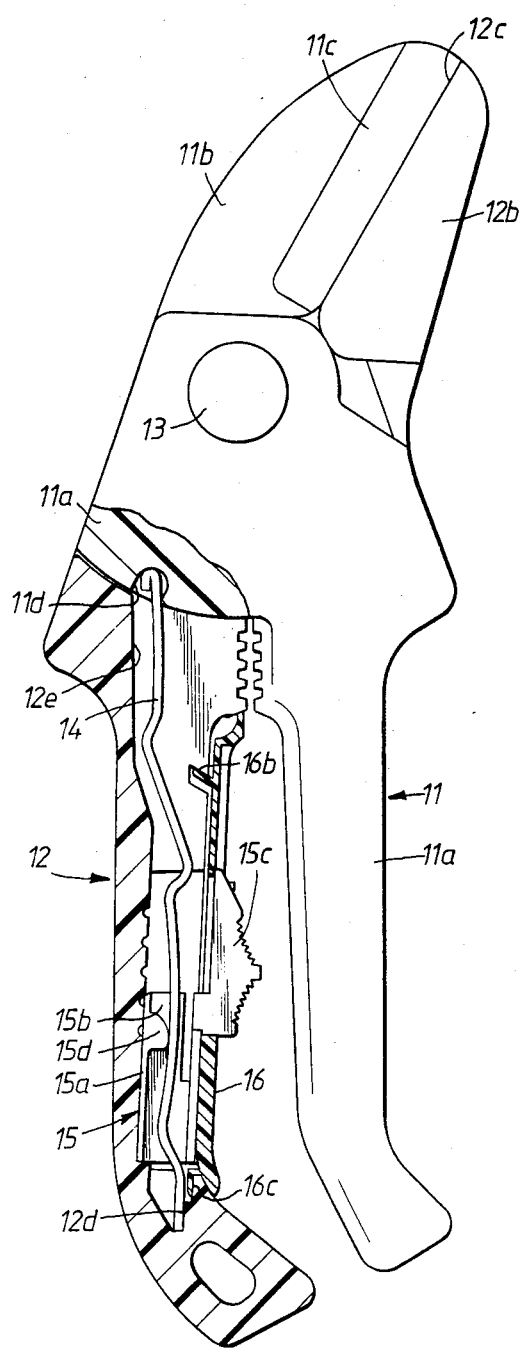
FIG. 1 is a side elevation part-sectional, of a garden pruner according to the invention, showing the spring applying minimum force.
Figure 2:
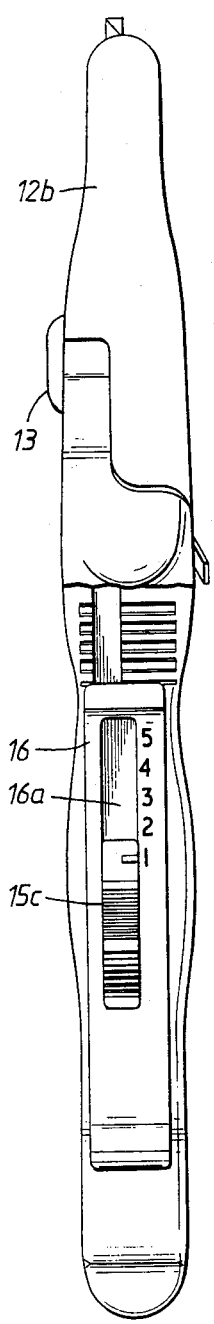
FIG. 2 is a view of the pruner of FIG. 1, as seen from the right hand side of FIG. 1 with part of one handle cut away to show the inside surface of the other handle.
Figure 3:
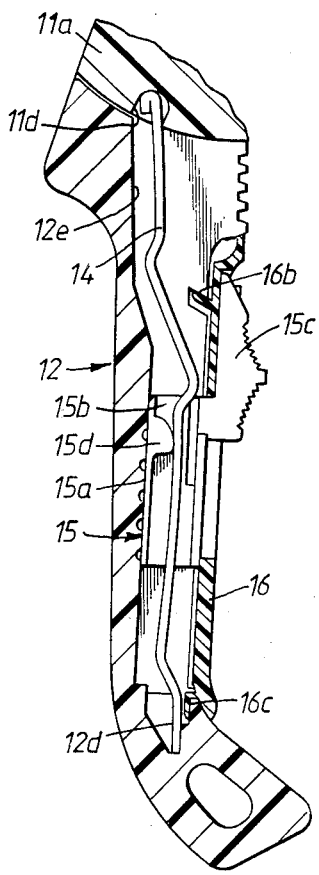
FIG. 3 is a fragmentary section of the pruner of FIG. 1 showing the spring applying maximum force.

In the example shown in the drawings, the garden pruner comprises two members 11,12, one comprising a handle 11a and a jaw 11b with which a cutting blade 11c is integral and the other comprising a handle 12a and a jaw 12b having an edge 12c which forms an anvil for engagement by the blade 11c. The members 11,12 are interconnected by a pivot bolt and nut assembly 13 (not shown in detail) and are biassed pivotally apart by a leaf spring 14.

The leaf spring 14 is secured at one end thereof in a recess 12d in the hollow interior of handle 12 and extends along this handle. The other end of the leaf spring 14 is received in a recess 11d in a surface of the other handle 11, this surface being part-cylindrical about the axis of the pivot bolt.

In order to vary the force, and in particular the spring rate of the spring, a slider 15 is provided which is slidable along a groove 12e in the handle 12 in contact with the spring 14, so that as the slider moves, it varies the length of the spring between the slider and the end of the spring which engages handle 11.

In particular, the slider is a plastics member comprising a block 15a having a groove 15b therein within which the spring lies. An abutment 15d formed in the base of the groove 15b is in sliding engagement with the leaf spring 14. An operating button 15c for engagement by a finger of the user is integral with the block 15a. Accordingly, the effective length of the leaf spring 14 is the length between abutment 15d and the point at which the end of the spring engages the handle 11a.

The slider, received in the groove 12e in handle 12, is guided in a slide plate 16 having a longitudinal slot 16a. The part of the slider 15 containing the groove 15b lies to one side of the slide plate 16 and the button 15c lies to the other side of this plate.

The slide plate 16 is formed at its opposite ends with oppositely inclined projecting fingers 16b, 16c, which, by flexing the plate, can be brought into engagement with corresponding recesses in the handle 12 so that upon releasing the plate, the latter is automatically locked to the handle. The slide plate can bear spaced-apart markings to indicate various spring rates which can be selected by moving the button 15c into register with the selected marking.

I claim:

1. A garden prune of the type comprising a pair of members, each comprising a handle and a work-engaging portion, pivot means pivotally interconnecting the members, a spring biasing the members apart, and means mounted on one of the handles and moveable to vary the force applied by the spring, wherein the spring is a leaf spring secured to said one of the handles and the means for varying the force of the spring is moveable to vary the effective length of the spring, and wherein the means for varying the effective length of the spring is a slider moveable along the spring.

2. A garden pruner according to claim 1 wherein the spring extends along one of the handles and the slider is slidable along said one of the handles.

3. A garden pruner according to claim 2 wherein the slider is a plastics member containing a groove within which the leaf spring engages, the handle containing a guide extending longitudinally of the handle within which the slider is received, and a button integral with the slider and projecting above the surrounding surface of the handle.

4. A garden pruner according to claim 3 wherein said guide comprises a guide plate fitted in the surface of the handle and having a slot along which the slider can slide, the part of the slider containing the groove lying to one side of the slot and the button lying to the opposite side thereof.

5. A garden pruner according to claim 3 wherein one end of the leaf spring is received in a recess in a surface of the other of said handles, said surface being part-cylindrical about the axis of the pivot means.

* * * * *